US009792839B2

(12) United States Patent
Cooper et al.

(10) Patent No.: US 9,792,839 B2
(45) Date of Patent: Oct. 17, 2017

(54) WIDE FILAMENT FASTENER AND STOCK

(75) Inventors: William J. Cooper, Natick, MA (US); Adam Dickson, Paris (FR)

(73) Assignee: Avery Dennison Corporation, Glendale, CA (US)

( * ) Notice: Subject to any disclaimer, the term of this patent is extended or adjusted under 35 U.S.C. 154(b) by 372 days.

(21) Appl. No.: 13/304,987

(22) Filed: Nov. 28, 2011

(65) Prior Publication Data

US 2012/0159903 A1 Jun. 28, 2012

Related U.S. Application Data

(60) Provisional application No. 61/426,689, filed on Dec. 23, 2010.

(51) Int. Cl.
*G06F 3/14* (2006.01)
*G09F 3/14* (2006.01)

(52) U.S. Cl.
CPC ............. *G09F 3/14* (2013.01); *Y10T 24/1498* (2015.01)

(58) Field of Classification Search
CPC ......... F16B 15/08; B65D 63/14; B65D 85/24; G09F 3/14
USPC ......... 206/343, 345, 346; 140/93 A; 227/67, 227/71; 24/16 PB
See application file for complete search history.

(56) References Cited

U.S. PATENT DOCUMENTS 3,354,539 A 11/1967 Hibbard
3,742,802 A 7/1973 Maerz
3,815,221 A 6/1974 Pearl
3,875,648 A 4/1975 Bone
4,039,078 A 8/1977 Bone
4,111,347 A 9/1978 Bone
(Continued)

FOREIGN PATENT DOCUMENTS

CN 1094366 11/1994
CN 1191197 8/1998
(Continued)

OTHER PUBLICATIONS

International Search Report dated Feb. 14, 2012 for International Application No. PCT/US2011/062205 filed Nov. 28, 2011.
(Continued)

*Primary Examiner* — Bryon Gehman
(74) *Attorney, Agent, or Firm* — Avery Dennison Corporation

(57) ABSTRACT

A length of fastener stock (111) includes opposing first and second continuous side members—(113-1) and (113-2) which are coupled together by a plurality of flexible cross-links (117). Individual fasteners (121) are selectively obtained from the stock (111) by cutting or separating the side members (113-1) and (113-2) at appropriate points (i.e., midway) between the cross-links or filaments (115). Accordingly, each fastener (121) will include a first cross-bar (123-1), which has been cut from side member (113-1), and a second cross-bar (123-2), which has been cut from side member (113-2), the cross-bars (123-1) and (123-2) being interconnected by the flexible filament (115). Suitably, with respect to an axial cross-section thereof, the width W of the flexible filament (115) is greater than or equal to approximately one and a half-times the height H of the filament (115).

12 Claims, 3 Drawing Sheets

(56) References Cited

U.S. PATENT DOCUMENTS

| | | | | |
|---|---|---|---|---|
| 4,288,017 | A | 9/1981 | Russell | |
| 4,456,123 | A * | 6/1984 | Russell | 206/343 |
| 4,456,161 | A | 6/1984 | Russell | |
| 4,592,499 | A | 6/1986 | Kato | |
| 4,640,222 | A | 2/1987 | Gerber | |
| 4,640,320 | A * | 2/1987 | Avison et al. | 140/93 A |
| 4,664,306 | A * | 5/1987 | Levy | 227/67 |
| 4,712,677 | A | 12/1987 | Russell | |
| 4,955,475 | A | 9/1990 | McCarthy et al. | |
| 5,020,713 | A | 6/1991 | Kunreuther | |
| 5,038,931 | A | 8/1991 | Kunreuther | |
| 5,042,535 | A * | 8/1991 | Schlottke | 140/93 A |
| 5,092,829 | A | 3/1992 | Gerber | |
| 5,205,458 | A | 4/1993 | Kunreuther | |
| RE34,857 | E | 2/1995 | Kunreuther | |
| RE34,858 | E | 2/1995 | Kunreuther | |
| RE34,891 | E | 4/1995 | Kunreuther | |
| 5,579,976 | A | 12/1996 | Kunreuther | |
| 5,615,816 | A | 4/1997 | Deschenes et al. | |
| 5,678,746 | A * | 10/1997 | Grendol | 227/67 |
| 5,678,747 | A | 10/1997 | Kunreuther | |
| 5,755,371 | A | 5/1998 | Huang | |
| 5,810,238 | A | 9/1998 | Kunreuther | |
| 5,931,298 | A | 8/1999 | Huang | |
| 5,950,901 | A | 9/1999 | Kubota | |
| 5,967,316 | A * | 10/1999 | Abbruzzese et al. | 206/343 |
| 6,220,434 | B1 * | 4/2001 | Kubota et al. | 206/343 |
| 6,244,490 | B1 | 6/2001 | Flannery et al. | |
| 6,318,553 | B1 | 11/2001 | Deschenes | |
| 6,371,293 | B2 * | 4/2002 | Kubota et al. | 206/343 |
| 6,427,895 | B1 * | 8/2002 | Deschenes | 227/67 |
| 6,561,405 | B2 | 5/2003 | Flannery et al. | |
| 6,561,406 | B1 | 5/2003 | Furutsu | |
| 6,564,939 | B1 * | 5/2003 | Deschenes et al. | 206/343 |
| 6,569,369 | B2 | 5/2003 | Shilale | |
| 6,732,899 | B2 | 5/2004 | Franks | |
| 7,036,680 | B1 | 5/2006 | Flannery et al. | |
| 7,308,983 | B2 * | 12/2007 | Shilale et al. | 206/346 |
| 7,444,922 | B2 | 11/2008 | Harashima et al. | |
| 7,681,730 | B2 * | 3/2010 | Cooper et al. | 206/343 |
| 8,413,866 | B2 | 4/2013 | Cooper et al. | |
| 8,657,172 | B2 | 2/2014 | Cooper | |
| 2002/0134810 | A1 | 9/2002 | Flannery et al. | |
| 2002/0179672 | A1 | 12/2002 | Flannery et al. | |
| 2003/0218043 | A1 | 11/2003 | Cooper et al. | |
| 2004/0205939 | A1 * | 10/2004 | Cooper et al. | 24/16 PB |
| 2008/0164271 | A1 | 7/2008 | Cooper et al. | |
| 2008/0190956 | A1 | 8/2008 | Earley et al. | |
| 2012/0279023 | A1 * | 11/2012 | Burout | 24/16 PB |

FOREIGN PATENT DOCUMENTS

| | | |
|---|---|---|
| CN | 2478931 | 2/2002 |
| CN | 2478932 | 2/2002 |
| CN | 1341539 | 3/2002 |
| CN | 2513732 | 10/2002 |
| CN | 1408619 | 4/2003 |
| CN | 2550270 | 5/2003 |
| CN | 2567156 | 8/2003 |
| CN | 1457311 | 11/2003 |
| CN | 200964193 | 10/2007 |
| CN | 101104983 | 1/2008 |
| CN | 101184668 | 5/2008 |
| CN | 201087255 | 7/2008 |
| CN | 201089535 | 7/2008 |
| CN | 201115438 | 9/2008 |
| CN | 101362521 | 2/2009 |
| CN | 101450719 | 6/2009 |
| CN | 101628637 | 1/2010 |
| CN | 101734392 | 6/2010 |
| CN | 201619718 | 11/2010 |
| CN | 201633970 | 11/2010 |
| CN | 201712833 | 1/2011 |
| CN | 201751304 | 2/2011 |
| CN | 102046475 | 5/2011 |
| CN | 201849699 | 6/2011 |
| DE | 2805034 | 8/1979 |
| DE | 3115112 | 4/1982 |
| DE | 3213933 | 11/1982 |
| DE | 3512747 | 10/1985 |
| DE | 19748592 | 5/1999 |
| EP | 0888727 | 1/1999 |
| GB | 2053296 | 2/1981 |
| JP | H0161019 | 4/1984 |
| KR | 100679188 | 2/2007 |
| WO | WO9410044 | 5/1994 |
| WO | 97/20664 | 6/1997 |
| WO | 2004/094236 | 11/2004 |
| WO | WO2005005265 | 1/2005 |
| WO | 2010/081042 | 7/2010 |

OTHER PUBLICATIONS

Written Opinion dated Feb. 14, 2012 for International Application No. PCT/US2011/062205 filed Nov. 28, 2011. .

International Search Report and Written Opinion dated Jan. 16, 2015 for Internation Application No. PCT/US2014/053043 filed Aug. 28, 2014.

International Search Report and Written Opinion dated Dec. 17, 2012 for Internation Application No. PCT/US2011/062187 filed Nov. 28, 2011.

International Search Report and Written Opinion dated Feb. 6 2012 for Internation Application No. PCT/US2011/062189 filed Nov. 28, 2011.

* cited by examiner

WIDE FILAMENT FASTENER AND STOCK

CROSS-REFERENCE TO RELATED APPLICATION

The present application claims priority from U.S. Provisional Application No. 61/426,689 filed Dec. 23, 2010, which is incorporated by herein by reference in its entirety.

FIELD OF THE INVENTION

The present invention generally relates to fasteners and fastening systems, and in particular to fasteners or staples and a fastener stock configured to reduce twisting and rotating of fasteners.

BACKGROUND OF THE INVENTION

Fasteners secure articles of commerce to packaging such as display cards. Typically, a continuous roll or length of ladder or fastener stock is provided from which individual fasteners are cut or otherwise separated. Such fasteners and/or fastener stock can be made of a suitable plastic or other like material by rotary extrusion, injection molding and/or any other suitable method. The fasteners are then attached to the article of commerce by using any number of devices known for dispensing and/or attaching.

When securing an article of commerce to packaging or a display card, a filament of a fastener wraps around the article and passes through holes, punctures, or perforations in the packaging or display card. The article of commerce may be any number of different types of goods, household products, or garments. However, when the article is pushed or pulled laterally with respect to the packaging or display card, the filament may twist and/or turn or otherwise rotate about its axis.

Accordingly, a new and/or improved fastener and/or fastener stock is disclosed which addresses the above-referenced problem(s) and/or others.

BRIEF SUMMARY OF THE INVENTION

The embodiments of the present invention described below are not intended to be exhaustive or to limit the invention to the precise forms disclosed in the following detailed description. Rather, the embodiments are chosen and described so that others skilled in the art may appreciate and understand the principles and practices of the present invention.

According to one aspect, a fastener stock includes two parallel longitudinal side members and a plurality of cross-links. The longitudinal side members are connected by the perpendicular cross-links, which have a cross-section where a width of the cross-link is at least one and a half greater than a height of the cross-link. In another embodiment, the width of the cross-link is greater than one and a half of the height of the cross-link.

In another embodiment, the fastener stock is composed of a plastic or a synthetic material from either a molding or an extrusion process.

In another embodiment, an individual plastic fastener is separated from a length of fastener stock by cutting the longitudinal side members between the cross-links.

In another embodiment, the fastener is attached to an article of commerce to packaging by a needle assembly of a fastener dispensing machine or hand tool.

In another embodiment, a method of applying the fastener and the article to packaging includes the steps of: feeding a substantially continuous length of fastener stock, engaging at least one continuous longitudinal side member with a feed mechanism, urging the fastener stock in a forward direction, cutting a fastener from the fastener stock at a cut location, and inserting the fastener around the article and into the packaging.

Other features and advantages of the present invention will become apparent to those skilled in the art from the following detailed description. It is to be understood, however, that the detailed description of the various embodiments and specific examples, while indicating preferred and other embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

These, as well as other objects and advantages of this invention, will be more completely understood and appreciated by referring to the following more detailed description of the presently preferred exemplary embodiments of the invention in conjunction with the accompanying drawings.

DETAILED DESCRIPTION OF THE INVENTION

The apparatuses and methods disclosed in this document are described in detail by way of examples and with reference to the figures. Unless otherwise specified, like numbers in the figures indicate references to the same, similar, or corresponding elements throughout the figures. It will be appreciated that modifications to disclosed and described examples, arrangements, configurations, components, elements, apparatuses, methods, materials, etc. can be made and may be desired for a specific application. In this disclosure, any identification of specific shapes, materials, techniques, arrangements, etc. are either related to a specific example presented or are merely a general description of such a shape, material, technique, arrangement, etc. Identifications of specific details or examples are not intended to be, and should not be, construed as mandatory or limiting unless specifically designated as such. Selected examples of apparatuses and methods are hereinafter disclosed and described in detail with reference made to the figures.

Figure 1:
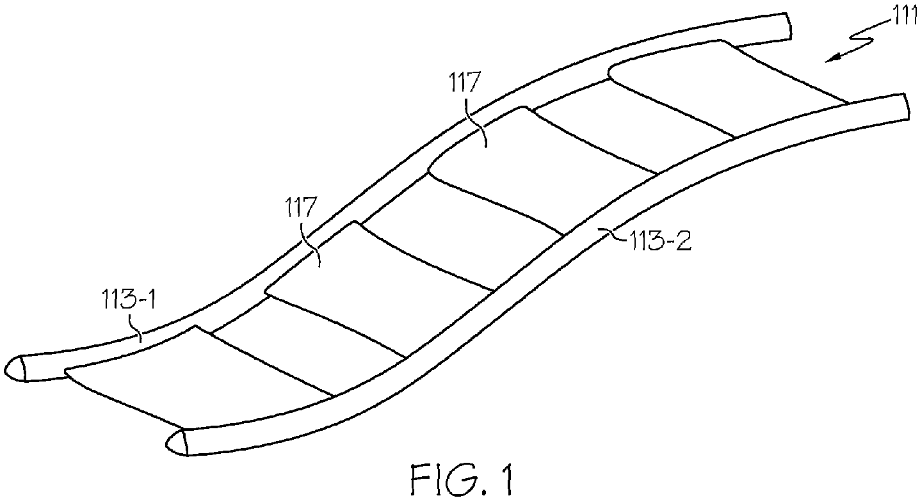
FIG. 1 is a perspective view showing a length of continuously connected fastener stock in accordance with aspects of the present inventive subject matter.

With reference now to FIG. 1, a perspective view of a length of continuously connected fastener stock 111 is shown. The fastener stock 111 (or ladder stock as it is otherwise known) includes two elongated, opposing, and continuous side members or longitudinal side members 113-1 and 113-2 coupled by a plurality of optionally equidistantly-spaced cross-links or filaments or cross members 117 (i.e., rungs).

The two elongated and continuous side members 113-1 and 113-2 are extended in a parallel spaced relationship. The plurality of cross-links 117 is perpendicular to the two elongated and continuous side members 113-1 and 113-2.

Fastener stock 111 is generally formed by extruding or molding from a resilient, flexible plastic or synthetic material such as polypropylene, polyurethane, nylon, polyvinyl chloride, or other similar durable, flexible thermo-plastic or elasticomeric materials. The fastener stock 111 must be sufficiently flexible along the cross-links 115 and sufficiently stiff along the continuous longitudinal side members 113-1 and 113-2 so that the ends of a fastener 121 (FIGS. 2 and 3) can be easily inserted and pushed through a needle slot of a dispensing system needle assembly, and will have sufficient strength to hold/be retained within a garment, paper, fabric or other article of commerce 50 (FIG. 5) to which the fastener 121 (FIGS. 2 and 3) is applied. Suitably, during manufacture, a portion of the cross-link 117 of the fastener stock 111 may be stretched after molding to bring the cross-links 117 to their desired lengths and to strengthen the cross-links 117 by orienting the molecules therein along a common axis.

Individual fasteners 121 (FIGS. 2 and 3) are obtained from the fastener stock 111 by cutting or separating the side members 113-1 and 113-2 at appropriate points (e.g., midway) between the cross-links 117. Once separated from the fastener stock 111, individual fasteners 121 (FIGS. 2 and 3) having an H-shape are produced.

Figure 2:
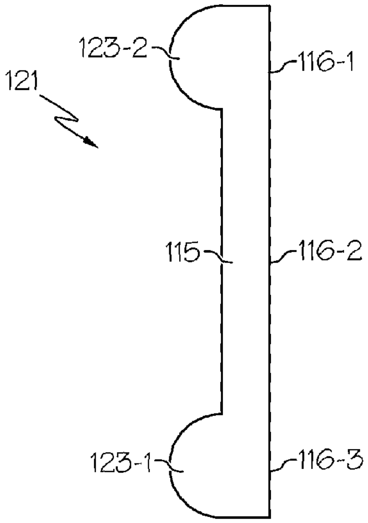
FIG. 2 is an enlarged side view showing an individual fastener obtained from the length of continuously connected fastener stock of FIG. 1.

Referring now to FIG. 2, a side view of the individual fastener 121 obtained in the aforementioned manner from the length of fastener stock 111 (FIG. 1) is shown. The fastener 121 includes a first cross-bar 123-1, which has been cut from the side member 113-1 (FIG. 1), and a second cross-bar 123-2, which has been cut from the side member 113-2 (FIG. 1). The cross-bars 123-1 and 123-2 are interconnected by a flexible filament 115. From the manufacturing process by which the fastener stock 111 (FIG. 1) is formed, the transverse cross-section of cross-bars 123-1 and 123-2 and flexible filament 115 are generally in the form a flattened semi-ellipse, or flattened semi-oval, that includes a flat bottom surface on sides 116-1, 116-2, and 116-3. This creates a D-shaped profile with opposing inner and outer surfaces that are generally flat with a rounded top surface. However, it is to be understood that the transverse cross-section of each of side members 113-1 and 113-2 and 117 cross-links 11 could be modified without departing from the spirit of the present invention.

Figure 3:
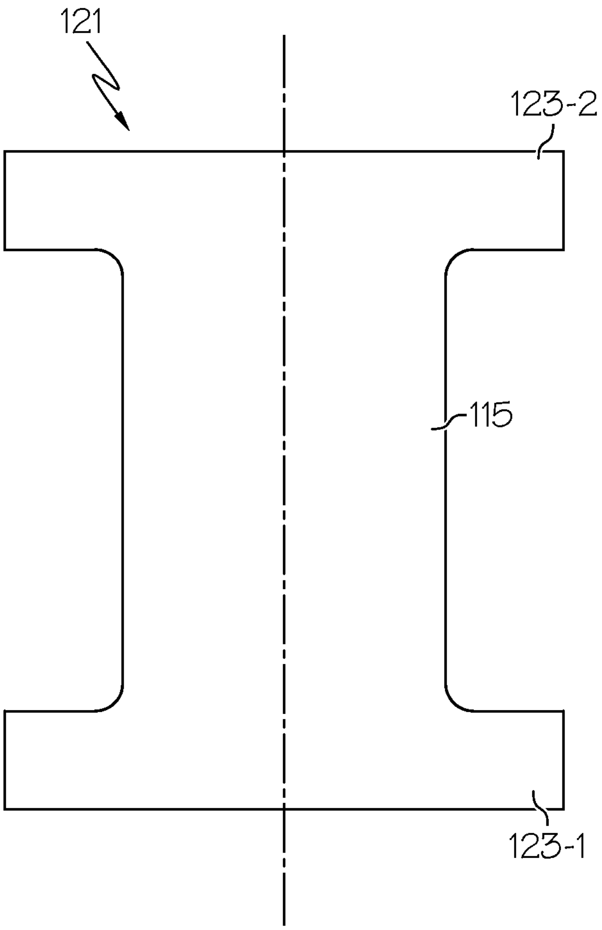
FIG. 3 is an enlarged front view showing the individual fastener obtained from the length of continuously connected fastener stock of FIG. 1.

Referring now to FIG. 3, a front view of the individual fastener 121 obtained from cutting the side members 113-1 and 113-2 (FIG. 1) is shown. The fastener 121 includes a first cross-bar 123-1, which has been cut from the side member 113-1 (FIG. 1), and a second cross-bar 123-2, which has been cut from the side member 113-2 (FIG. 1). The cross-bars 123-1 and 123-2 are interconnected by the flexible filament 115.

Figure 4:
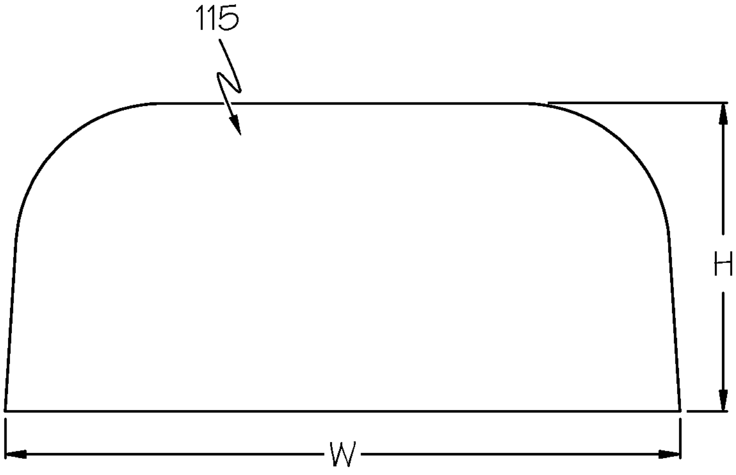
FIG. 4 is an axial cross-section view of a filament shown in FIG. 3.

With reference now to FIG. 4, an axial cross-section of the flexible filament 115 is shown. The dimension W corresponds to a width of the flexible filament 115 and the dimension H corresponds to a height of the flexible filament 115. Suitably, as shown here, the width W of the flexible filament 115 is significantly greater than its height H.

In one embodiment, the width W is greater than or equal to approximately one and a half of its height H (i.e., $W \geq 1.5H$). Suitably, the width W is at least twice the height H, i.e., $W \geq 2H$. In another embodiment, the width W can be as much as around 10 times the height H, i.e., $10H \geq W \geq 1.5H$. In practice, a suitable flexible filament 115 optionally has a height H of approximately 0.027 inches and a width W in the range of about 0.040 inches to about 0.300 inches.

In addition to the varying height and width of the flexible filament 115, the length of the flexible filament 115 may vary based upon the size and shape of the article of commerce 50 (FIG. 5) that the fastener 121 (FIGS. 2 and 3) is securing. The larger the article 50 (FIG. 5), the longer the flexible filament 115 may be to secure the article 50 (FIG. 5).

Figure 5:
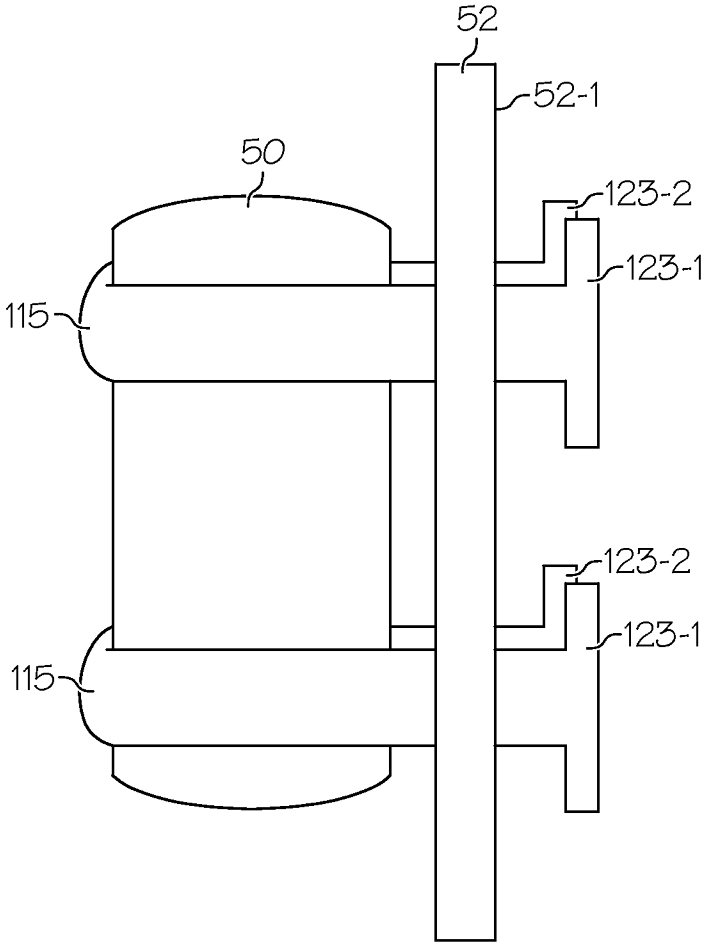
FIG. 5 is a diagrammatic illustration showing a side view of an article of commerce secured to a display card.

In one embodiment as shown in FIG. 5, the fastener 121 (FIG. 3) attaches the article of commerce 50 to a display card 52. Due to the width, the flexible filament 115 resists twisting and turning or otherwise rotating about its axis in response to lateral movement. To attach the article of commerce 50 to the display card 52, the flexible filament 115 wraps around the article of commerce 50. The display card 52 contains punctures or holes to correspond with a placement of the article 50 on the display card 52. The punctures or holes in the display card 52 may be a variety of sizes and shapes. To keep the article 50 secured, cross-bar 123-1 and cross-bar 123-2 are inserted into their respective puncture or hole in the display card 52. Once the cross-bars 123-1 and 123-2 are inserted so the cross-bars 123-1 and 123-2 are on a backside 52-1 of the display card, the article 50 is stabilized and will not move against the display card 52.

The display card 52 shown in FIG. 5 is not limiting and the article 50 may be attached to a variety of packaging materials used for product displays. FIG. 5 only shows one embodiment of the display card 52; however, the display card 52 may be composed from a variety of materials and in a variety of shapes. In addition to the display card 52, package materials include any organic or synthetic material used to display or present articles of commerce 50 for purchase.

In addition to the embodiment described above, the fastener 121 (FIGS. 2 and 3) may attach to the article of commerce 50 by inserting at least one cross-bar 123-1 into the packaging materials. Also, the fastener 121 (FIGS. 2 and 3) may insert at least one cross-bar 123-1 into the article of commerce 50 itself.

Due to the width of the flexible filament 115 (FIG. 3), fasteners 121 (FIGS. 2 and 3) may be used in other applications than a conventional fastener. The fastener 121 (FIGS. 2 and 3) may be used for heavy articles of commerce 50 (FIG. 5).

In practice, any number of known devices, such as a traditional fastener device with a rotary feed, may be used for dispensing and/or attaching the fasteners 121 (FIGS. 2 and 3). Please note, all patents, patent applications and articles noted or otherwise mentioned in the present specification are hereby incorporated herein by reference in their entirety. Additionally, it is to be appreciated that the present specification has been set forth with reference to preferred embodiments. Obviously, modifications and alterations will occur to others upon reading and understanding the present specification. It is intended that the invention be construed as including all such modifications and alterations insofar as they come within the scope of the appended claims or the equivalents thereof.

It will thus be seen according to the present invention a highly advantageous fastener stock with wide cross-links has been provided. While the invention has been described in connection with what is presently considered to be the most practical and preferred embodiment, it will be apparent to those of ordinary skill in the art that the invention is not to be limited to the disclosed embodiment, and that many modifications and equivalent arrangements may be made thereof within the scope of the invention, which scope is to be accorded the broadest interpretation of the appended claims so as to encompass all equivalent structures and products.

The inventors hereby state their intent to rely on the Doctrine of Equivalents to determine and assess the reasonably fair scope of their invention as it pertains to any apparatus, system, method or article not materially departing from but outside the literal scope of the invention as set out in the following claims.

What is claimed is:

1. A length of fastener stock, comprising a pair of longitudinal side members and a plurality of cross-links interconnecting said longitudinal side members, each of said plurality of cross-links has a length, a cross-section width, and a cross-section height, wherein said cross-section width is one and a half times greater than a cross-section height of each of said plurality of cross-links, and said cross-links generally are in the form of a flattened semi-ellipse, or flattened semi-oval, that includes a flat bottom surface on one side; and wherein each of said longitudinal side members has a flat side and a D-shaped profile with opposing inner and outer surfaces that are generally flat with a rounded top surface and said plurality of cross-links are equidistantly spaced from each other, said cross-section width and said cross section height are configured to substantially resist rotation of an individual plastic fastener about an axis along said length in response to a lateral movement when applied around an article of commerce.

2. A length of fastener stock as recited in claim 1, wherein said longitudinal side members are composed of a synthetic material.

3. A length of fastener stock as recited in claim 1, wherein said plurality of cross-links is composed of a synthetic material.

4. A length of fastener stock as recited in claim 1, wherein said plurality of cross-links is perpendicular to said longitudinal side members such that each of said plurality of cross-links is arranged at a spaced interval along said longitudinal side members.

5. A length of fastener stock as recited in claim 1, wherein each of said longitudinal side members is parallel to the other of said longitudinal side members.

6. A length of fastener stock as recited in claim 1, wherein each of said cross-links has a flat side.

7. A length of fastener stock as recited in claim 1, wherein said longitudinal side members and said cross-links are coplanar.

8. A length of fastener stock as recited in claim 1, wherein said longitudinal side members and said cross-links are formed by an extrusion process.

9. A length of fastener stock as recited in claim 1, wherein said longitudinal side members and said cross-links are formed by a molding process.

10. An individual plastic fastener separated from the length of fastener stock recited in claim 1.

11. The individual plastic fastener as recited in claim 10 wherein said individual plastic fastener attaches an article of commerce to packaging.

12. The individual plastic fastener as recited in claim 10 wherein said cross-section width is between more than three times greater and approximately ten times greater than a cross-section height of each of said plurality of cross-links.

* * * * *